United States Patent
Ishida

(10) Patent No.: US 8,077,661 B2
(45) Date of Patent: *Dec. 13, 2011

(54) ACCESS GATEWAY APPARATUS, BASE STATION APPARATUS, COMMUNICATION CONTROL SYSTEM AND COMMUNICATION CONTROL METHOD

(75) Inventor: Hiroshi Ishida, Kanagawa (JP)

(73) Assignee: Panasonic Corporation, Osaka (JP)

( * ) Notice: Subject to any disclaimer, the term of this patent is extended or adjusted under 35 U.S.C. 154(b) by 508 days.

This patent is subject to a terminal disclaimer.

(21) Appl. No.: 12/376,956

(22) PCT Filed: Sep. 13, 2006

(86) PCT No.: PCT/JP2006/318158
§ 371 (c)(1),
(2), (4) Date: Feb. 26, 2009

(87) PCT Pub. No.: WO2008/032373
PCT Pub. Date: Mar. 20, 2008

(65) Prior Publication Data
US 2009/0257375 A1 Oct. 15, 2009

(51) Int. Cl.
*H04W 4/00* (2009.01)
(52) U.S. Cl. ..... 370/328; 370/352; 370/389; 455/435.1; 455/433
(58) Field of Classification Search ........... 370/310, 370/328; 455/435.1, 90.3, 466, 500
See application file for complete search history.

(56) References Cited

U.S. PATENT DOCUMENTS

| 6,393,288 B1 * | 5/2002 | Sollee et al. ........... 455/445 |
| 2002/0086685 A1 * | 7/2002 | Wallentin et al. ........... 455/458 |
| 2006/0025161 A1 | 2/2006 | Funato |

FOREIGN PATENT DOCUMENTS

| JP | 2003-143643 | 5/2003 |
| JP | 2005-86560 | 3/2005 |

OTHER PUBLICATIONS

International Search Report dated Nov. 21, 2006.
T. Fujii et al., "Ubiquitous Network ni Okeru IP Mobility no Kuban Seigyo Gijutsu," The Journal of the Institute of Electronics, Information and Communication Engineers, vol. 87, No. 5, May 1, 2004, pp. 390-395.

(Continued)

*Primary Examiner* — Jason Mattis
*Assistant Examiner* — Maria Sekul
(74) *Attorney, Agent, or Firm* — Dickinson Wright PLLC

(57) ABSTRACT

A communication control system capable of reducing the traffic amount, CPU's processing load and channel bands related to a location registering process. In this system, a paging part (303) of a base station apparatus (300) receives a call request message transmitted from an access gateway apparatus (200) and addressed to a wireless terminal apparatus, and generates a call response message indicative of accommodating the wireless terminal apparatus. An MIP location registering part (304) registers an IP address established at the transmitting source of the call request message, and generates a location registration request message that requests a registration of an IP address established at the local base station. A packet combining part (305) generates and transmits a combined packet, which is obtained by combining the call request message with the location registration request message, to the access gateway apparatus (200).

4 Claims, 10 Drawing Sheets

OTHER PUBLICATIONS

J. Kempf, "Requirements and Functional Architecture for an IP Host Alerting Protocol," Network Working Group, Request for Comments: 3154 Category: Informational, Aug. 2001, pp. 1-16, p. 12, line 5.

C. Perkins, Ed., "IP Mobility Support for IPv4," Network Working Group, Request for Comments: 3344, Nokia Research Center, Obsoletes: 3220, Category: Standards Track, Aug. 2002, pp. 1-99, p. 12, line 7.

D. Johnson, "Mobility Support in IPv6," Network Working Group, Request for Comments: 3775, Rice University, Category: Standards Track, Nokia Research Center, Jun. 2004, pp. 1-165, p. 12, line 9.

3GPP Joint RAN WG2 WG3 Meeting, R2-052900, Nov. 7-11, 2005, Seoul, Korea, Agenda Item: 5, Source: Ericsson, Title: "Solutions for a 2-node 3GPP SAE / LTE architecture," Document for: Discussion, Decision, 6 pages total, p. 12, line 3.

* cited by examiner

ACCESS GATEWAY APPARATUS, BASE STATION APPARATUS, COMMUNICATION CONTROL SYSTEM AND COMMUNICATION CONTROL METHOD

TECHNICAL FIELD

The present invention relates to access gateway apparatus, a base station apparatus, communication control system and communication control method in a next-generation 3GPP system.

BACKGROUND ART

The 3rd generation partnership project ("3GPP") is currently studying a next-generation 3GPP system to be connected to existing 3GPP systems, the Internet, wireless local area networks ("WLANs") and so on. FIG. 1 shows a network architecture of a next-generation 3GPP system (i.e. evolved 3GPP system) (Non-Patent Document 1).

Next-generation 3GPP system 10 shown in FIG. 1 is comprised of other 3GPP systems (including existing 3GPP systems), non-3GPP systems (including WLAN systems) and a plurality of access gateways (hereinafter "ACGWs") 20-1 to 20-n connected to the Internet and a plurality of enhanced Node Bs (hereinafter "eNode Bs") 30-1 to 30-n accommodated in these access gateways.

Although it is currently under study by the 3GPP, basically, eNode B 30 directly accommodates radio terminal apparatuses (i.e. user equipment, or hereinafter "UEs") and provides radio access functions between eNode B 30 and UEs. ACGW 20 accommodates a plurality of eNode Bs 30-1 to 30-n and transmits/receives packets between eNode Bs 30-1 to 30-n and other ACGWs. Furthermore, ACGW 20 provides mobility functions and so on for when UEs move between the eNode Bs accommodated in ACGW 20. For example, when a UE moves from eNode B 30-1 to eNode B 30-2 accommodated in ACGW 20, ACGW 20 switches the path from source eNode B 30-1 of the UE to destination eNode B 30-2. ACGW 20 then transmits a data packet received from another ACGW to eNode B 30-2 to which the path is set, and transmits a data packet transmitted from this eNode B 30-2 to another ACGW connected to the eNode B that accommodates the UE of the destination of the data packet. Although there are cases where a path is tentatively set directly from eNode B 30-1 to eNode B 30-2 and data directed to a UE is directly transferred from eNode B 30-1 to eNode B 30-2, eventually, ACGW 20 switches the path.

Next, the mobility control scheme for a radio terminal apparatus that moves between eNode Bs, which is the technique the above-described next-generation 3GPP system is based upon, will be explained. FIG. 2 schematically shows the mobility control for when a radio terminal apparatus moves between eNode Bs. For ease of explanation, a case will be explained here using two eNode Bs.

When UE 40 accommodated in eNode B 30-1 moves to the area covered by eNode B 30-2, UE 40 transmits a transfer request to ACGW 20 via eNode B 30-2. To be more specific, UE 40 transmits a transfer request for switching the path to ACGW 20 via eNode B 30-2, in order to establish a radio link and carry out radio communication with eNode B 30-2 having stronger radio intensity than eNode B 30-1, based on the radio intensity received from eNode B 30. ACGW 20 receives the transfer request from eNode B 30-2 and switches the path, so that data directed to UE 40, which has been transmitted using path 1 by then, will be transmitted using path 2. ACGW 20 then transmits a transfer reply to UE 40. In this way, the system performs such transfer control on a UE that moves between eNode Bs.

Next, the mobility control technique shown in FIG. 2 will be explained in detail using FIG. 3. FIG. 3 illustrates the mobility control scheme in detail.

This next-generation 3GPP system 10 provides eNode B 30 with a proxy mobile agent ("proxy MA") and ACGW 20 with a local home agent ("local MA"), using a proxy MIP, and carries out various mobile IP (mobile Internet protocol or hereinafter "MIP")-related processings. Here, the mobile IP refers to a protocol for automatically detecting a transfer of a radio terminal apparatus between networks and for enabling the radio terminal apparatus to carry out communication in the network after the transfer in the same way as in the network before the transfer.

As shown in FIG. 3, since UE 40 is accommodated in eNode B 30-1, first, IP tunnel 1 is constructed between eNode B 30-1 and ACGW 20, and ACGW 20 and eNode B 30-1 transmit/receive data directed to UE 40 using this IP tunnel 1.

Here, when UE 40 attempts to move to eNode B 30-2, UE 40 transmits radio intensity information (i.e. measurement report) to eNode B 30-1 and reports a transfer request (step S1). This radio intensity information includes radio intensity information of UE 40 and eNode B 30-1 and radio intensity information of UE 40 and eNode B 30-2. Upon receiving radio intensity information from UE 40, eNode B 30-1 exchanges information such as resource reservation with destination eNode B 30-2, and checks whether or not eNode B 30-2 can accept UE 40 (step S2). Although this information exchange is normally carried out via ACGW 20, when, for example, eNode Bs are connected via a physical channel, direct exchange of information may be possible. When eNode B 30-2 can accept UE 40, eNode B 30-1 transmits a handover request message (i.e. handover request) to UE 40 (step S3). Upon receiving the handover request message, that is, upon receiving a transfer request to eNode B 30-2, UE 40 establishes a radio link with destination eNode B 30-2 (i.e. radio bearer setup) (step S4), and transmits a transfer completion message (i.e. HO complete) to eNode B 30-2 after having established a radio link (step S5).

eNode B 30-2 then transmits a position registration request message (i.e. MIP registration request) to ACGW 20 (step S6), and, ACGW 20 having received this position registration request message makes changes to a routing table that ACGW 20 holds inside. That is, when the destination IP address of an IP packet matches the IP address of UE 40 in the routing table, ACGW 20 changes the care of address ("CoA") from eNode B 30-1 to eNode B 30-2, carries out IP encapsulation of the data packet, and transmits the data packet to UE 40.

ACGW 20 then transmits a position registration revocation message (i.e. MIP registration revocation) to eNode B 30-1 (step S7), and releases the resources of source eNode B 30-1. eNode B 30-1 then transmits a position registration revocation reply message (i.e. MIP registration revocation acknowledgement) to ACGW 20 (step S8). Furthermore, ACGW 20 transmits a position registration reply message (i.e. MIP registration reply) to eNode B 30-2 (step S9). Through the above-described processing, the packet directed to UE 40 after the transfer transmitted from another ACGW is transferred to eNode B 30-2 by ACGW 20.

Next, FIG. 4 shows a scheme adopting the control premised upon the above-described mobility technique disclosed in IETF RFC 3154, as a conventional paging control technique (Non-Patent Document 2).

First, UE 40 is in an idle state, and the network side knows the tracking area of UE 40. Here, a tracking area refers to the area where an ACGW accommodates an eNode B. ACGW 20 holds information about radio terminal apparatuses accommodated in the eNode B in this tracking area. Here, for example, as shown in FIG. 4, ACGW 20 knows that UE 40 is somewhere among eNode B 30-1, eNode B 30-2, . . . eNode B 30-*n*.

An entity (not shown) such as an ACGW having received an IP packet of data directed to UE 40, transmits a paging request message (i.e. paging request) to ACGW 20 that accommodates the tracking area of UE 40 of the destination of the packet (step S11). Here, the entity where the IP packet is terminated once may be another apparatus connected to ACGW 20 over the Internet and so on. That is, ACGW 20 having received the data packet looks up the database of the core network (e.g., network constructed between communication systems), finds out the apparatus (here, ACGW 20) that accommodates the eNode B which accommodates destination UE 40 from the IP address of the received data packet, and transmits a paging request message reporting that the data directed to UE 40 has been received, to the apparatus.

ACGW 20 having received the paging request message performs its own paging processing, and transmits paging request messages to all eNode Bs 30 in the tracking area of UE 40 (step S12). The eNode B that actually accommodates UE 40 (here, eNode B 30-2) establishes a radio link with UE 40 (step S13), and then transmits a paging reply message (i.e. paging reply) to ACGW 20 (step S14). ACGW 20 receives the paging reply message and transmits the paging reply message to the terminating entity of the IP packet, that is, to the apparatus of the sender of the IP packet (step S15).

eNode B 30-2 performs its own position registration processing, that is, registers the IP address set in ACGW 20 of the source of the paging request, and transmits a position registration request message (i.e. MIP registration request) to ACGW 20, to establish an IP tunnel with ACGW 20 (step S16). ACGW 20 having received the position registration request message, makes changes to the routing table. Here, the CoA of the IP packet, in which the destination IP address is the IP address of UE 40, is changed such that the IP packet is transmitted to the IP tunnel of the IP address of eNode B 302. ACGW 20 then transmits a position registration reply message (i.e. MIP registration reply) to eNode B 30-2 (step S17).

Paging processing and position registration processing are completed through the above-described processing, and an incoming IP packet directed to UE 40 is delivered to UE 40.

FIG. 5 shows a functional configuration of ACGW 20 and eNode B 30 that perform the above-described paging control. First, the functional configuration of ACGW 20 will be explained. ACGW 20 is comprised of IP layer processing section 21, paging processing section 22 and proxy MIP home agent (HIP HA) processing section 23.

IP layer processing section 21 of ACGW 20 decapsulates the packet using the IP address set in ACGW 20, and receives the packet. Particularly, IP layer processing section 21 receives a paging request message from another ACGW to a radio terminal apparatus in eNode B 30 accommodated in ACGW 20, and a paging reply message from eNode B 30, and outputs these messages to paging processing section 22. Furthermore, IP layer processing section 21 receives a position registration request message from eNode B 30, and outputs the message to MIP HA processing section 23.

Furthermore, IP layer processing section 21 encapsulates the packet using the IP address set in ACGW 20, and transmits the packet. Particularly, IP layer processing section 21 transmits a paging request message (i.e. PR) inputted from paging processing section 22 and a position registration reply message (i.e. MRRly) inputted from MIP HA processing section 23, to eNode B 30.

Based on the paging request message from another ACGW inputted from IP layer processing section 21, paging processing section 22 performs paging processing, that is, paging processing section 22 tentatively stores, in page units, information whereby the paging of the destination radio terminal apparatus can be checked, from inside the paging request message. Paging processing section 22 then outputs this paging request message to IP layer processing section 21 to transfer to the eNode B that accommodates the destination radio terminal apparatus of the paging request.

MIP HA processing section 23 receives a position registration request message inputted from IP layer processing section 21, and performs position registration processing of ACGW 20. That is, in order to establish a path with the position registration request source, when the IP address of the radio terminal apparatus included in the position registration request message matches the IP address of the destination radio terminal apparatus of the paging request, MIP HA processing section 23 makes the IP address of the destination radio terminal apparatus the home address and the IP address set in eNode B 30 of the position registration request source the CoA, generates a position registration reply message to transmit to eNode B 30 and outputs these addresses to IP layer processing section 21.

Next, the functional configuration of eNode B 30 will be explained. eNode B 30 is comprised of IP layer processing section 31, paging processing section 32 and proxy MIP mobile agent ("MIP MA") processing section 33.

IP layer processing section 31 of eNode B 30 decapsulates a packet using the IP address set in eNode B 30, and receives the packet. Particularly, IP layer processing section 31 receives a paging request message from paging processing section 22 of ACGW 20, and outputs the paging request message to paging processing section 32.

Furthermore, IP layer processing section 31 encapsulates a packet using the IP address set in eNode B 30, and transmits the packet. Particularly, IP layer processing section 31 receives a paging reply message (i.e. PRly) inputted from paging processing section 32 and a position registration request message (i.e. MRReq) inputted from MIP HA processing section 33, and transmits these messages to ACGW 20.

Paging processing section 32 receives a paging request message inputted from IP layer processing section 31 and performs paging processing, that is, paging processing section 32 tentatively stores, in page units, information whereby the paging of the destination radio terminal apparatus can be checked, from inside the paging request message. Paging processing section 32 then generates a paging reply message in response to this paging request, outputs the paging reply message to IP layer processing section 31 and triggers MIP MA processing section 33.

In order to perform the position registration processing of eNode B 30 according to the trigger from paging processing section 32, that is, in order to establish a path with the position registration request destination, MIP MA processing section 33 registers the IP address of the destination radio terminal apparatus included in the paging request message and the IP address set in ACGW 20 as the CoA for paging request source ACGW 20, and outputs the position registration request message (i.e. MIP registration request) for requesting the registration of the IP address set in eNode B 30 to IP layer processing section 31.

Non-Patent Document 1: 3GPP RAN #49 Contribution R2-052900
Non-Patent Document 2: IETF RFC 3154 "Requirements and Functional Architecture for an IP Host Alerting Protocol"
Non-Patent Document 3: IETF RFC 3344 "IP mobility Support for IPv4"
Non-Patent Document 4: IETF REFC 3775 "Mobility Support in IPv6"

DISCLOSURE OF INVENTION

Problems to be Solved by the Invention

Generally, reducing the load of position registration processing, that is, reducing position registration traffic, is recognized as an important issue.

However, according to the prior art, eNode B 30-2 transmits a paging reply message (i.e. paging reply) and then transmits a position registration request message (i.e. MIP registration request) to ACGW 20. That is, although these paging reply message and position registration request message include overlapping information, these messages are transmitted to the same destination, separately, at virtually the same transmission timing, and this increases the load of traffic processing. Furthermore, since overlapping information is transmitted separately useless load is imposed on the CPU of the apparatus constituting the system. Furthermore, transmitting the paging reply message and position registration request message separately may also result in an increase of the band used for the channel.

It is therefore an object of the present invention to provide a communication control system, access gateway apparatus, base station apparatus and communication control method that reduce the amount of traffic involved in position registration processing, processing load on the CPU and the band used for the channel.

Means for Solving the Problem

The access gateway apparatus of the present invention adopts a configuration including: a transmitting section that transmits a paging request message directed to a radio terminal apparatus to a base station apparatus accommodated in the access gateway apparatus; a separation section that separates a combined packet in which a paging reply message transmitted from the base station apparatus and indicating that the base station apparatus accommodates the radio terminal apparatus in response to the paging request message and a position registration request message for requesting the registration of an IP address set in the sender of the paging reply message are combined, into the respective messages; and a position registration section that registers the IP address set in the base station apparatus based on the position registration request message.

The base station apparatus of the present invention adopts a configuration including: a receiving section that receives a paging request message directed to a radio terminal apparatus transmitted from an access gateway apparatus; a paging reply section that generates a paging reply message indicating that the base station apparatus accommodates the radio terminal apparatus; a position registration requesting section that registers the IP address set in the access gateway apparatus of the sender of the paging request message and generates a position registration request message for requesting the registration of the IP address set in the base station apparatus; a packet combining section that generates a combined packet by combining the paging reply message and the position registration request message; and a transmitting section that transmits the combined packet to the access gateway apparatus.

Advantageous Effect of the Invention

The present invention makes a paging reply and a position registration request together, so that it is possible to reduce the amount of traffic involved in position registration processing, the CPU load of the apparatus and the band used for the channel.

BEST MODE FOR CARRYING OUT THE INVENTION

Hereinafter, an embodiment of the present invention will be explained in detail with reference to the accompanying drawings.

Figure 1:
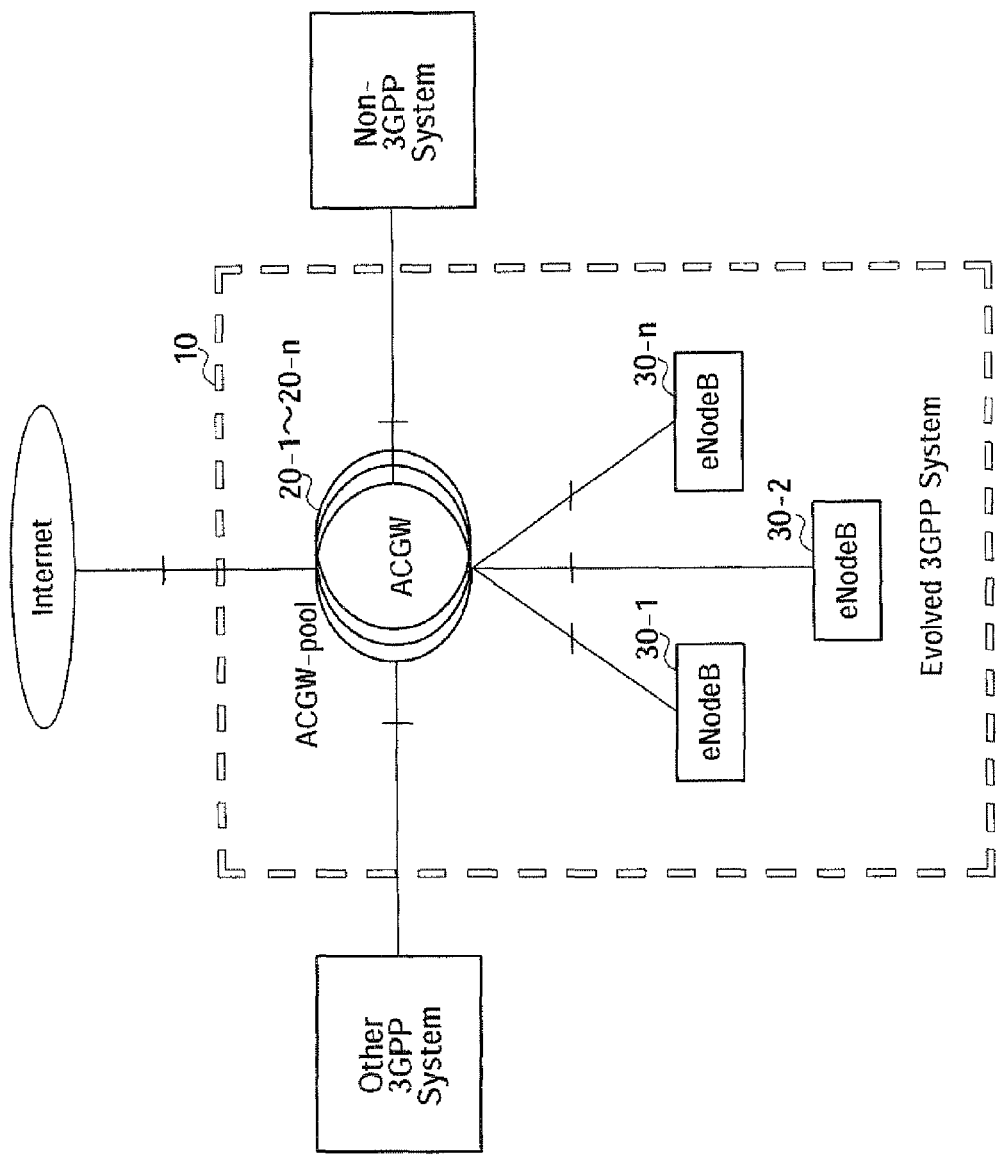
FIG. 1 shows a network architecture of a next-generation 3GPP system.
Figure 2:
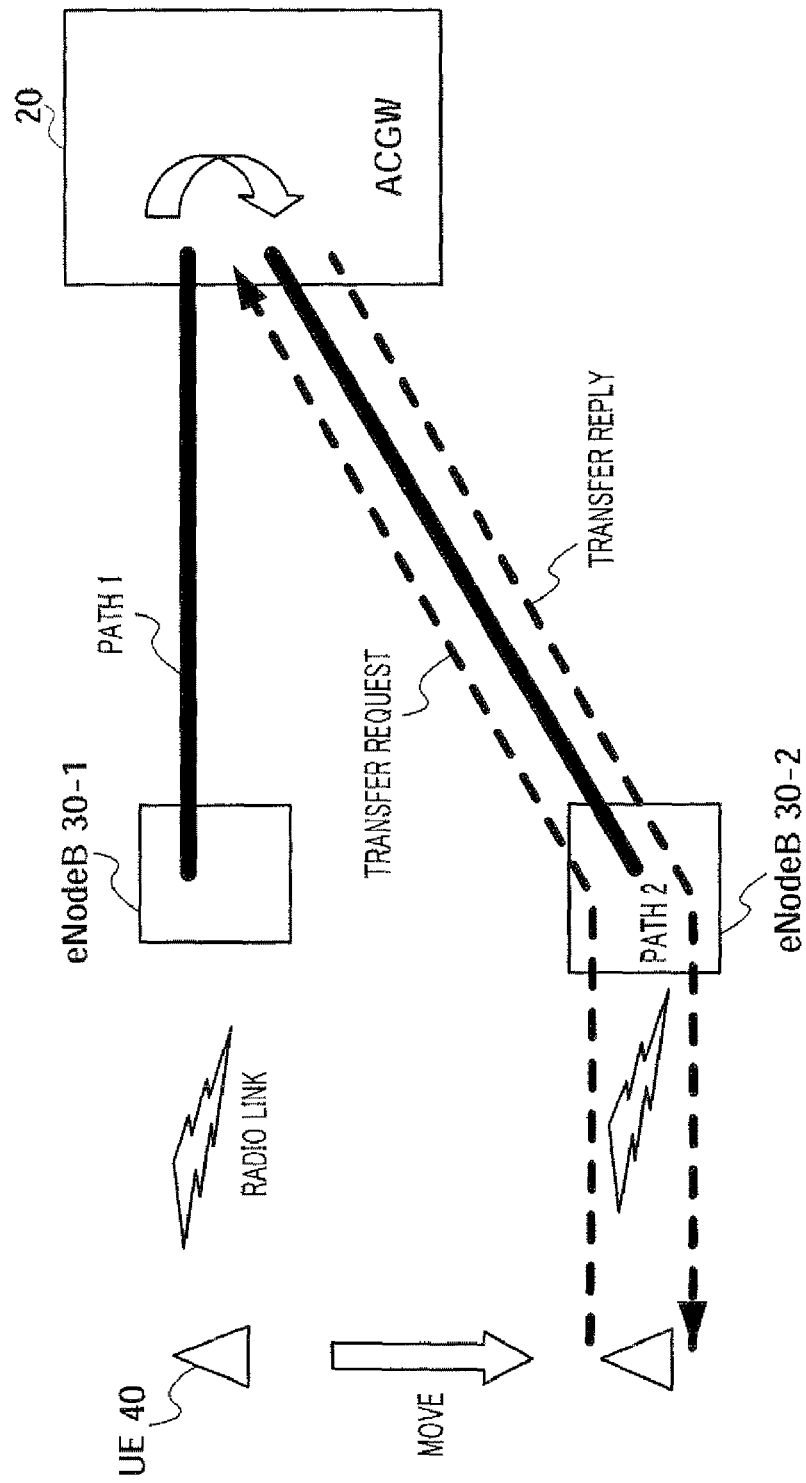
FIG. 2 is a schematic diagram to illustrate mobility control.
Figure 3:
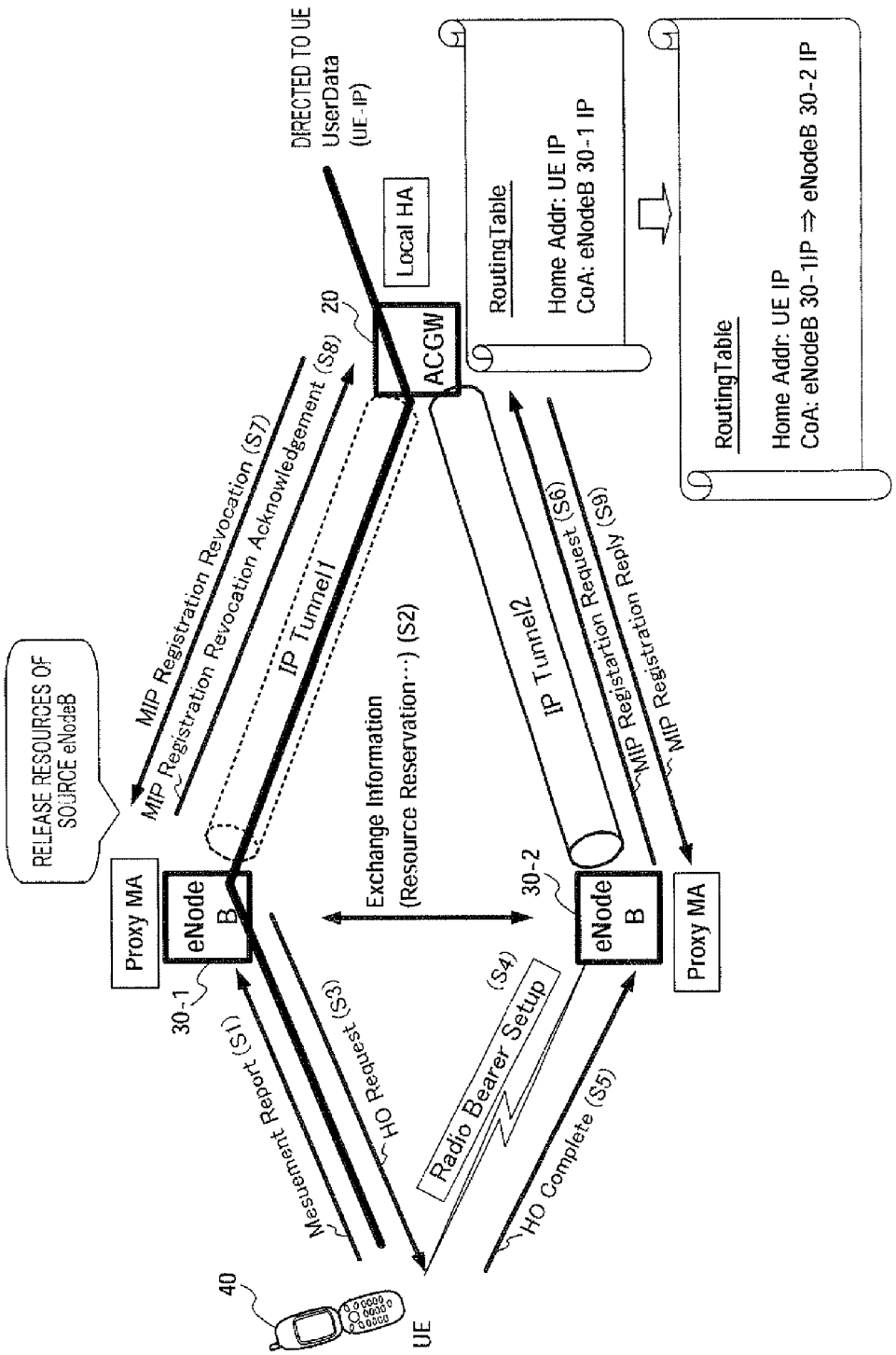
FIG. 3 illustrates the mobility control explained in FIG. 2 in further detail.
Figure 4:
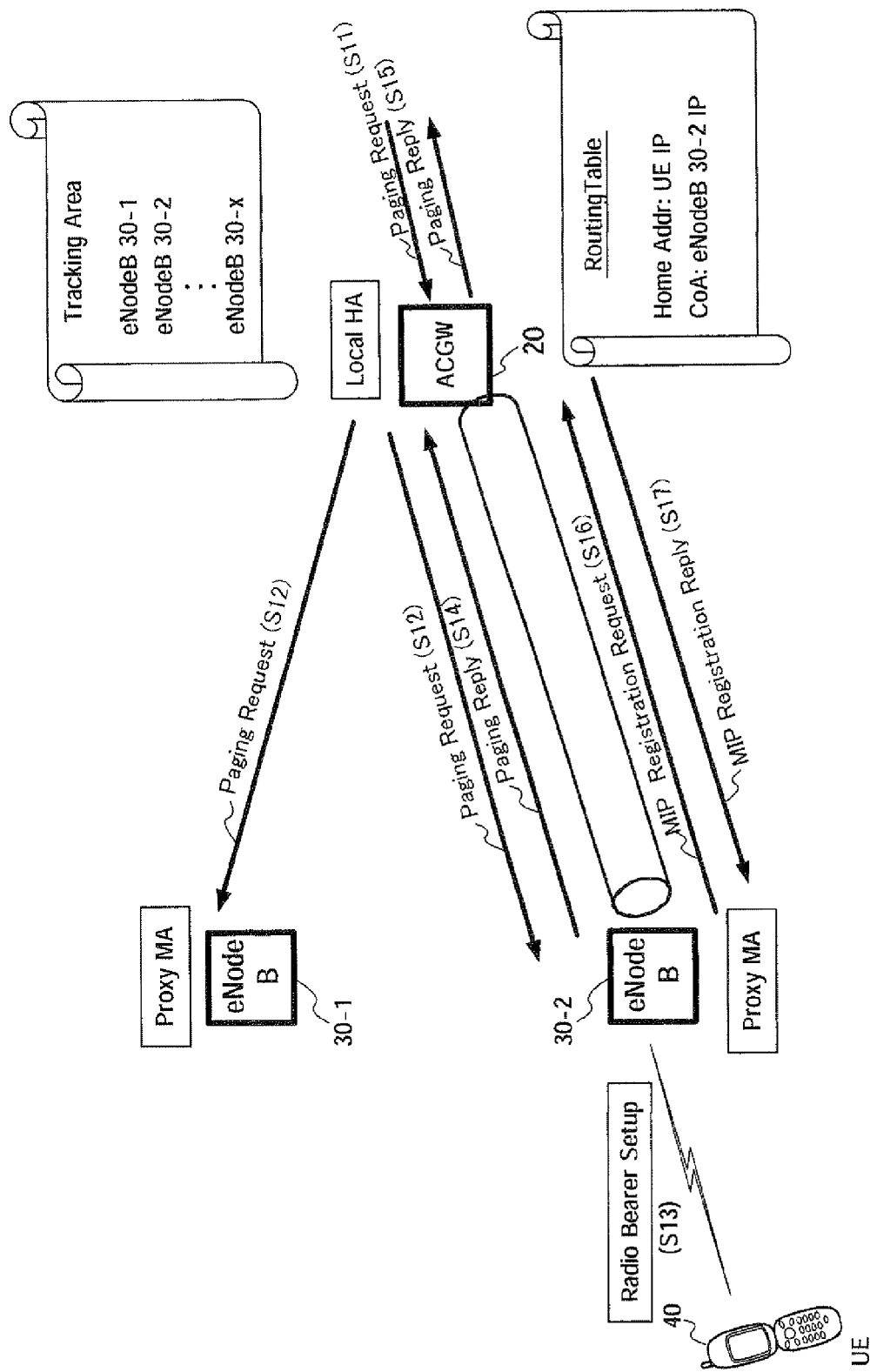
FIG. 4 illustrates a conventional paging control scheme in mobility control.
Figure 5:
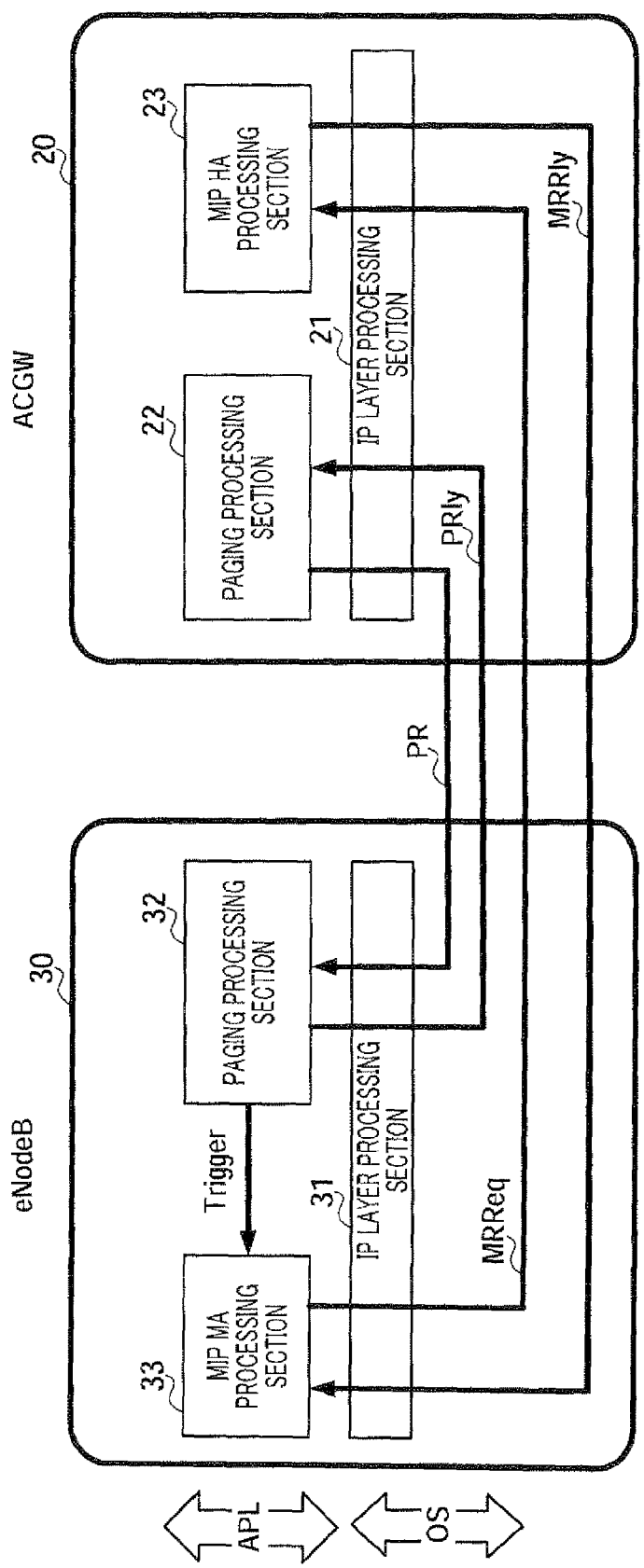
FIG. 5 shows configurations of conventional eNode B and ACGW.
Figure 6:
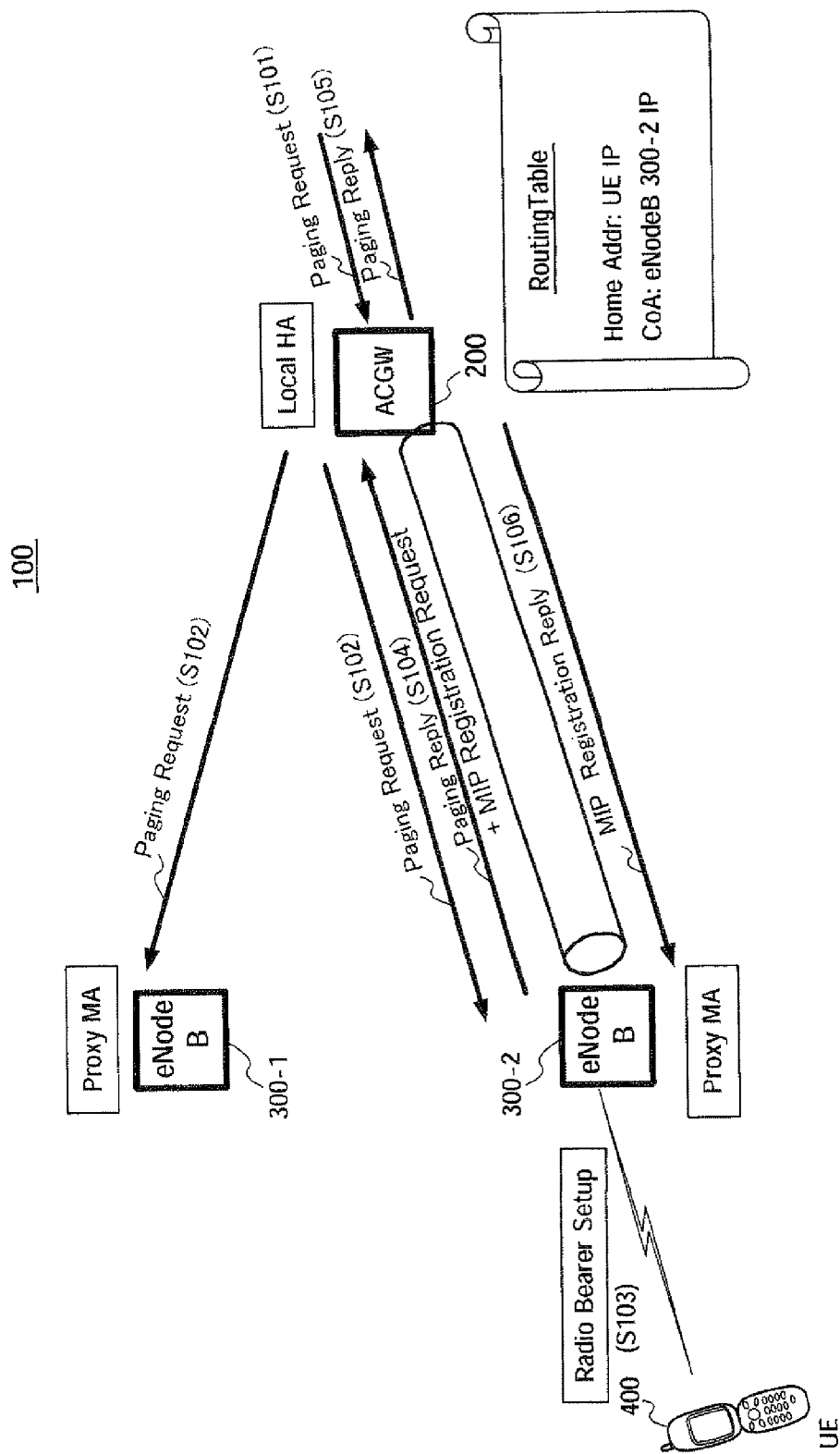
FIG. 6 schematically illustrates a paging control scheme in a communication control system according to an embodiment of the present invention.

FIG. 6 schematically shows the paging control scheme in communication control system 100 according to an embodiment of the present invention. Communication control system 100 shown in FIG. 6 is comprised of access gateway ("AGCW") apparatus 200, a plurality of eNode Bs 300-1 to 300-*n* accommodated in this access gateway apparatus 200, and radio terminal apparatus ("UE") 400 accommodated in this eNode B. For ease of explanation, the present embodiment will explain a case where two eNode Bs are used.

UE 400 shown in FIG. 6 is in an idle state, and the network side knows the tracking area of UE 400. Here, a "tracking area" (or referred to as "location area") refers to the area where an access gateway apparatus accommodates an eNode B. The access gateway apparatus is able to know information about radio terminal apparatuses accommodated in the eNode B in the tracking area. For example, in the case shown in FIG. 6, access gateway apparatus 200 knows that UE 400 is somewhere in eNode Bs 300-1 and 300-2.

The entity where an IP packet of data directed to UE 400 is terminated once, such as an access gateway apparatus, transmits a paging request message (i.e. paging request) to access gateway apparatus 200 that accommodates the tracking area of UE 400 of the destination of the packet (step S101). Here, the entity may be a different apparatus connected via the Internet and so on, but the present embodiment will explain another access gateway apparatus connected to access gateway apparatus 200, as the entity. That is, another access gateway apparatus having received a data packet looks up the database of the core network (e.g., network constructed between communication systems), finds out the apparatus (here, access gateway apparatus 200) that accommodates the eNode B that accommodates destination UE 400 from the destination IP address of the received data packet, and transmits a paging request message for reporting access gateway apparatus 200 that the data directed to UE 400 has been received.

Access gateway apparatus 200 having received the paging request message performs the paging processing necessary for access gateway apparatus 200 itself, that is, access gateway apparatus 200 tentatively stores, in page units, information whereby the paging of the destination radio terminal apparatus can be checked, from inside the paging request message, and transmits an paging request message to all eNode Bs 300 in the tracking area in UE 400 (step S102).

After a radio link is established with UE 400 (step S103), the eNode B (here, eNode B 300-2) that actually accommodates UE 400 performs paging processing, generates a paging reply message, and performs position registration processing and generates a position registration request message. eNode B 300-2 then combines the paging reply message (paging reply) and the position registration request message (MIP registration request) into one packet and transmits the packet to access gateway apparatus 200 (step S104). That is, eNode B 300-2 makes a paging reply and a position registration request, which are conventionally made separately, together in one operation.

Access gateway apparatus 200 then receives the combined packet, unties the packet, that is, separates the combined packet into the paging reply message and position registration request message, and performs paging processing and position registration processing. That is, access gateway apparatus 200 changes the home address and CoA in the routing table held in the access gateway apparatus 200. Here, the routing table is changed such that the home address becomes the IP address of destination UE 40 and the CoA becomes the IP address of eNode B 300-2 that accommodates UE 400. Access gateway apparatus 200 then transmits the paging reply message (paging reply) to the IP packet terminating entity (e.g., access gateway apparatus of the sender of the paging request message) (step S105), and transmits the position registration reply message (MIP registration reply) to eNode B 300-2 (step S106).

The processing so far completes the paging processing and position registration processing, so that the incoming IP packet directed to UE 400 is delivered to UE 400.

Next, the configurations of access gateway apparatus 200 and eNode B 300 constituting the above-described network will be explained. First, the configuration of access gateway apparatus 200 will be explained.

Figure 7:
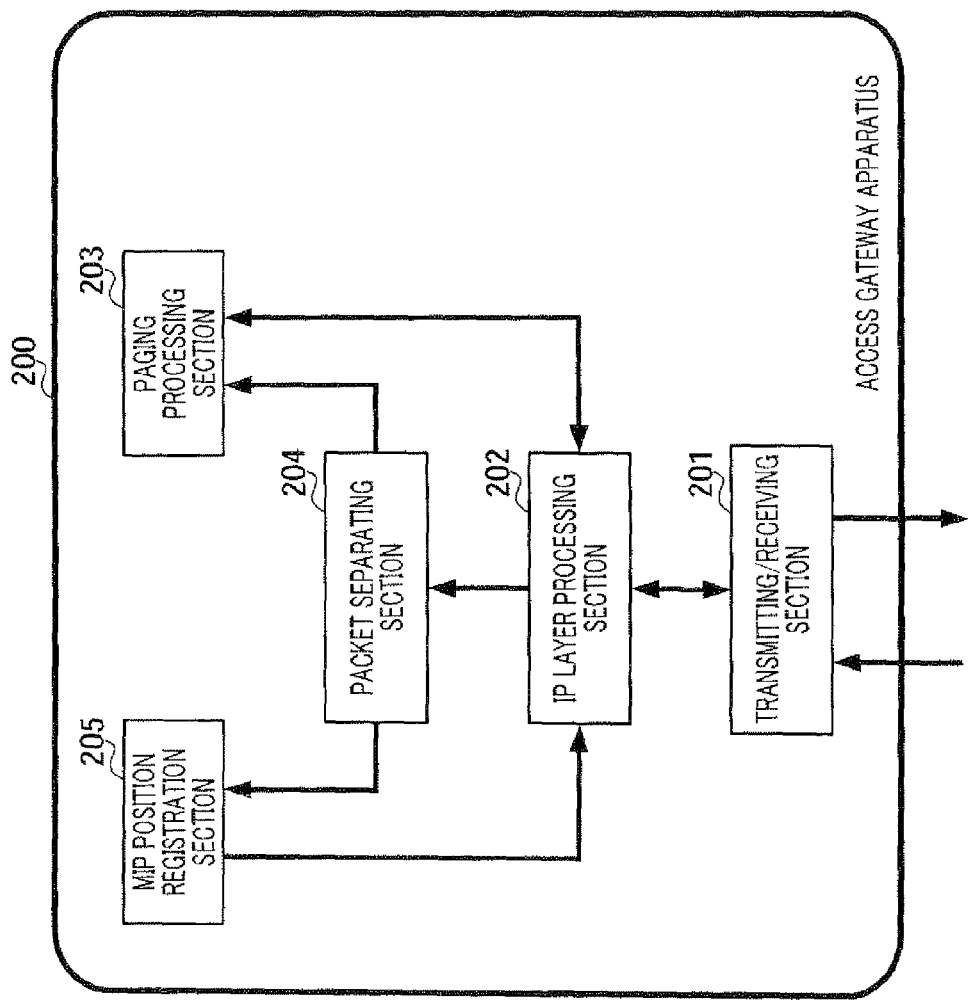
FIG. 7 is a functional block diagram showing a configuration of an access gateway apparatus according to the embodiment of the present invention.

FIG. 7 is a functional block diagram showing a configuration example of access gateway apparatus 200. Access gateway apparatus 200 shown in FIG. 7 is mainly comprised of transmitting/receiving section 201, IP layer processing section 202, paging processing section 203 and packet separation section 204 and mobile IP position registration section 205.

Transmitting/receiving section 201 receives an IP packet transmitted from another access gateway apparatus and so on, and outputs the IP packet to IP layer processing section 202. Furthermore, transmitting/receiving section 201 transmits an IP packet inputted from IP layer processing section 202 to a base station apparatus and soon accommodated in access gateway apparatus 200.

IP layer processing section 202 decapsulates the IP packet inputted from transmitting/receiving section 201, using the IP address set in access gateway apparatus 200, and outputs the decapsulated packet to paging processing section 203 and packet separation section 204. Particularly, upon receiving a packet including a paging request message from another ACGW to a radio terminal apparatus in base station apparatus 300 accommodated in access gateway apparatus 200, IP layer processing section 202 outputs this paging request message to paging processing section 203. Upon receiving the combined packet from base station apparatus 300, IP layer processing section 202 outputs the combined packet to packet separation section 204.

Furthermore, IP layer processing section 202 encapsulates a packet using the IP address set in access gateway apparatus 200, and outputs the encapsulated packet to transmitting/receiving section 201. Particularly, IP layer processing section 202 outputs a paging request message (i.e. PR) inputted from paging processing section 203 and a position registration reply message (i.e. MRRly) inputted from MIP position registration section 205, to transmitting/receiving section 201.

Paging processing section 203 carries out its own paging processing based on a paging request message from another access gateway apparatus and so on inputted from IP layer processing section 202. That is, paging processing section 203 tentatively stores, in page units, information whereby the paging of the destination radio terminal apparatus can be checked, from inside the paging request message. Paging processing section 203 then outputs this paging request message to IP layer processing section 202 to transfer to the base station apparatus that accommodates the destination radio terminal apparatus of the paging request.

Furthermore, paging processing section 203 receives the paging reply message from base station apparatus 300 received from packet separation section 204 as input and checks whether or not the IP address of the radio terminal apparatus included in this paging reply message matches the IP address of the destination radio terminal apparatus from the information tentatively stored at the time of making the paging request. Here, when the IP addresses match, the IP address of the base station apparatus that accommodates the radio terminal apparatus, included in the position registration request message, which will be described later, is registered as the CoA with the routing table.

Packet separation section 204 separates the combined packet from base station apparatus 300 received from IP layer processing section 202 as input into the paging reply message (paging reply) and position registration request message (MIP registration request) and outputs the paging reply message to paging processing section 203 and the position registration request message to MIP position registration section 205.

MIP position registration section 205 has a proxy MIP home agent ("MIP HA") function and carries out MIP-related processing. Particularly, MIP position registration section 205 performs its own position registration processing, that is, registers the IP addresses of the destination radio terminal apparatus of the paging request and the source base station apparatus of the position registration request based on the position registration request message inputted from packet separation section 204. That is, based on the position registration request message, when the IP address set in radio terminal apparatus 400 matches the IP address of the radio terminal apparatus of the paging destination, MIP position registration section 205 makes the IP address of this radio terminal apparatus the home address and registers the IP address of base station apparatus 300 as the CoA. This CoA is stored in a table (not shown) and so on, and becomes the address set in an IP tunnel, which will be described later. A router, which is actually set in the tunnel, identifies the transfer destination according to the IP address in the packet set in base station apparatus 300, that is, CoA, and transfers the packet. MIP position registration section 205 then outputs the position registration reply message (MIP registration reply) to IP layer processing section 202. By this means, a path, that is, an IP tunnel, is established between access gateway apparatus 200 and base station apparatus 300, the source of the position registration request.

Figure 8:
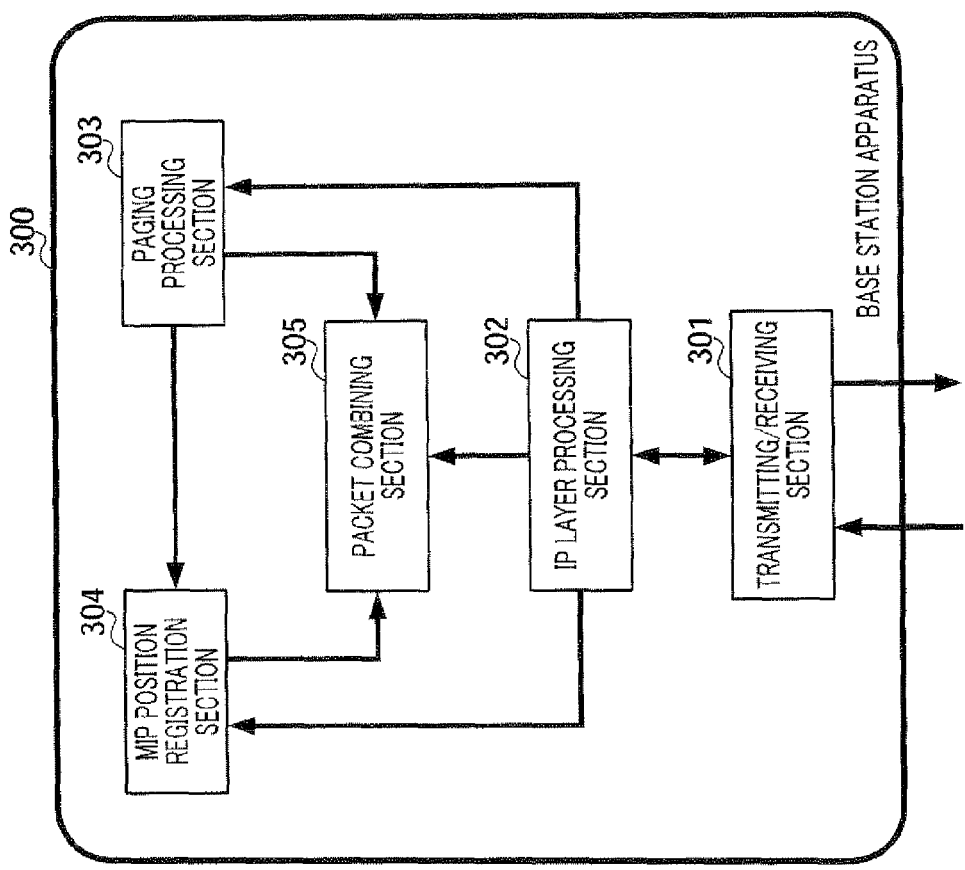
FIG. 8 is a functional block diagram showing a configuration of a base station apparatus according to the embodiment of the present invention.

Next, the configuration of eNode B will be explained. FIG. 8 is a functional block diagram showing a configuration example of eNode B 300. The present embodiment will explain a base station apparatus as an example of eNode B 300.

Base station apparatus 300 shown in FIG. 8 is mainly comprised of transmitting/receiving section 301, IP layer processing section 302, paging processing section 303, mobile IP ("MIP MA") position registration section 304 and packet combining section 305.

Transmitting/receiving section 301 receives an IP packet transmitted from access gateway apparatus 200 and outputs the IP packet to IP layer processing section 302. Furthermore, transmitting/receiving section 301 transmits the IP packet inputted from IP layer processing section 302 to access gateway apparatus 200.

IP layer processing section 302 decapsulates the IP packet inputted from transmitting/receiving section 301 using the IP address set in base station apparatus 300, and outputs the decapsulated IP packet to paging processing section 303 and MIP position registration section 304, Particularly, upon receiving a packet including a paging request message directed to the radio terminal apparatus transmitted from access gateway apparatus 200 and accommodated in base station apparatus 300, IP layer processing section 302 outputs this paging request message to paging processing section 303, and upon receiving a packet including a paging reply message and position registration reply message transmitted from access gateway apparatus 200, IP layer processing section 302 outputs this paging reply message and position registration reply message to MIP position registration section 304.

Furthermore, IP layer processing section 302 encapsulates a packet using the IP address set in base station apparatus 300, and outputs the encapsulated packet to transmitting/receiving section 301. Particularly, IP layer processing section 302 outputs the packets combined in packet combining section 305 to transmitting/receiving section 301.

Paging processing section 303 receives the paging request message from access gateway apparatus 200 received from IP layer processing section 302 as input and decides whether or not base station apparatus 300 can accommodate the radio terminal apparatus of the destination of this paging request and establish a radio link. Here, when the radio terminal apparatus is accommodated, paging processing section 303 decides that it is possible to establish a radio link, triggers MIP position registration section 304, generates a paging reply message (paging reply) indicating that base station apparatus 300 accommodate the radio terminal apparatus in response to the paging request message, and outputs the paging reply message to packet combining section 305. When the radio terminal apparatus is not accommodated, paging processing section 303 does not create the paging reply message.

MIP position registration section 304 has a proxy MIP mobile agent function and performs MIP-related processings. Particularly, MIP position registration section 304 performs position registration processing of MIP position registration section 304 itself, that is, registers the positions of the radio terminal apparatus of the destination radio terminal apparatus of the paging request and access gateway apparatus 200, the paging request source according to the trigger from paging processing section 303. That is, MIP position registration section 304 registers the IP address set in radio terminal apparatus 400, the paging request destination and the IP address set in access gateway apparatus 200, the paging request source, generates a position registration request message (MIP registration request) for requesting the registration of the IP address set in base station apparatus 300, and outputs the position registration request message to packet combining section 305. This position registration request is made to establish a path, that is, an IP tunnel, with access gateway apparatus 200 and the IP tunnel is established when access gateway apparatus 200 and base station apparatus 300 register the mutually set IP addresses.

Figure 9:
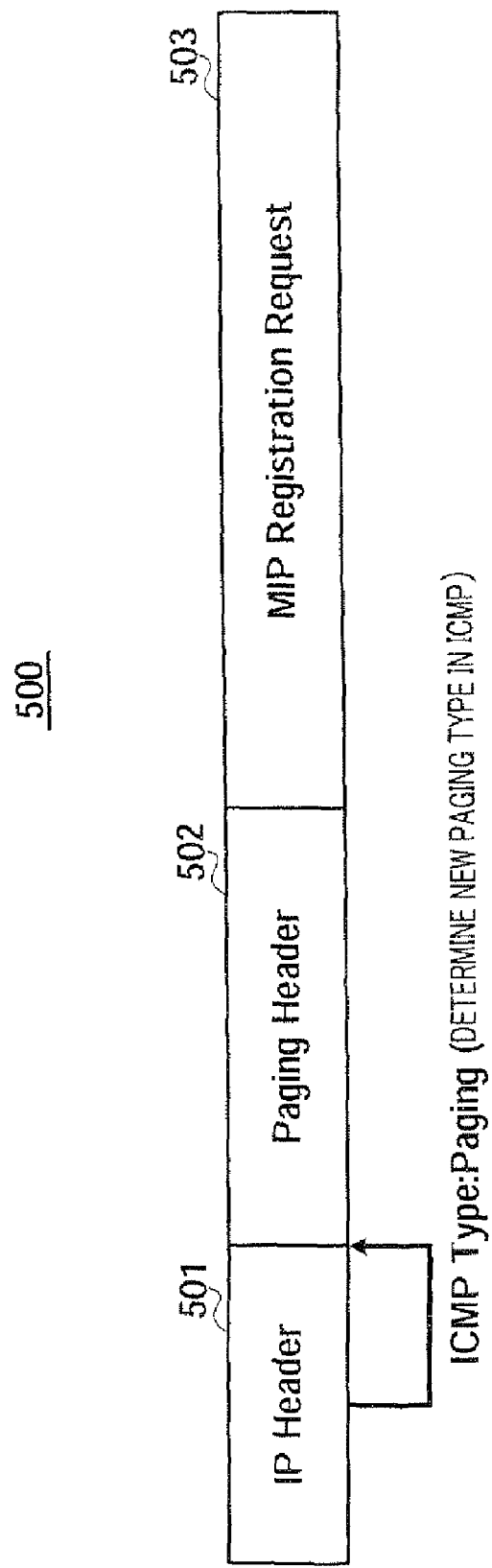
FIG. 9 shows an example of combined packet according to the embodiment of the present invention.

Packet combining section 305 combines the paging reply message received from paging processing section 303 as input and the position registration request message received from MIP registration section 304 as input into one packet as shown, for example, in FIG. 9 and outputs the packet to IP layer processing section 302. By this means, it is possible to combine the paging reply processing and position registration request processing into one processing, so that it is possible to reduce the amount of traffic involved in position registration processing, processing load on the CPU and the band used for the channel.

Here, the combined packet generated in packet combining section 305 will be explained FIG. 9 shows a configuration example of the combined packet generated in packet combining section 305. Here, for example, "paging" is newly defined as a type of ICMP (Internet control message protocol) used in "ping" (packet inter network groper), but the combined packet is not limited to this type of packet. That is, any packet that combines a paging reply message and position registration request message into one packet is applicable as the combined packet.

Combined packet 500 shown in FIG. 9 is comprised of IP header (header) 501, paging header 502 and payload 503. A paging reply message is then inserted as paging header (virtually the same information as payload) 502 in the place used as the normal option header and a position registration request message (MIP registration request) is inserted in payload part 503 after this page header 502. By this means, it is possible to combine the paging reply message and the position registration request message into one packet.

Figure 10:
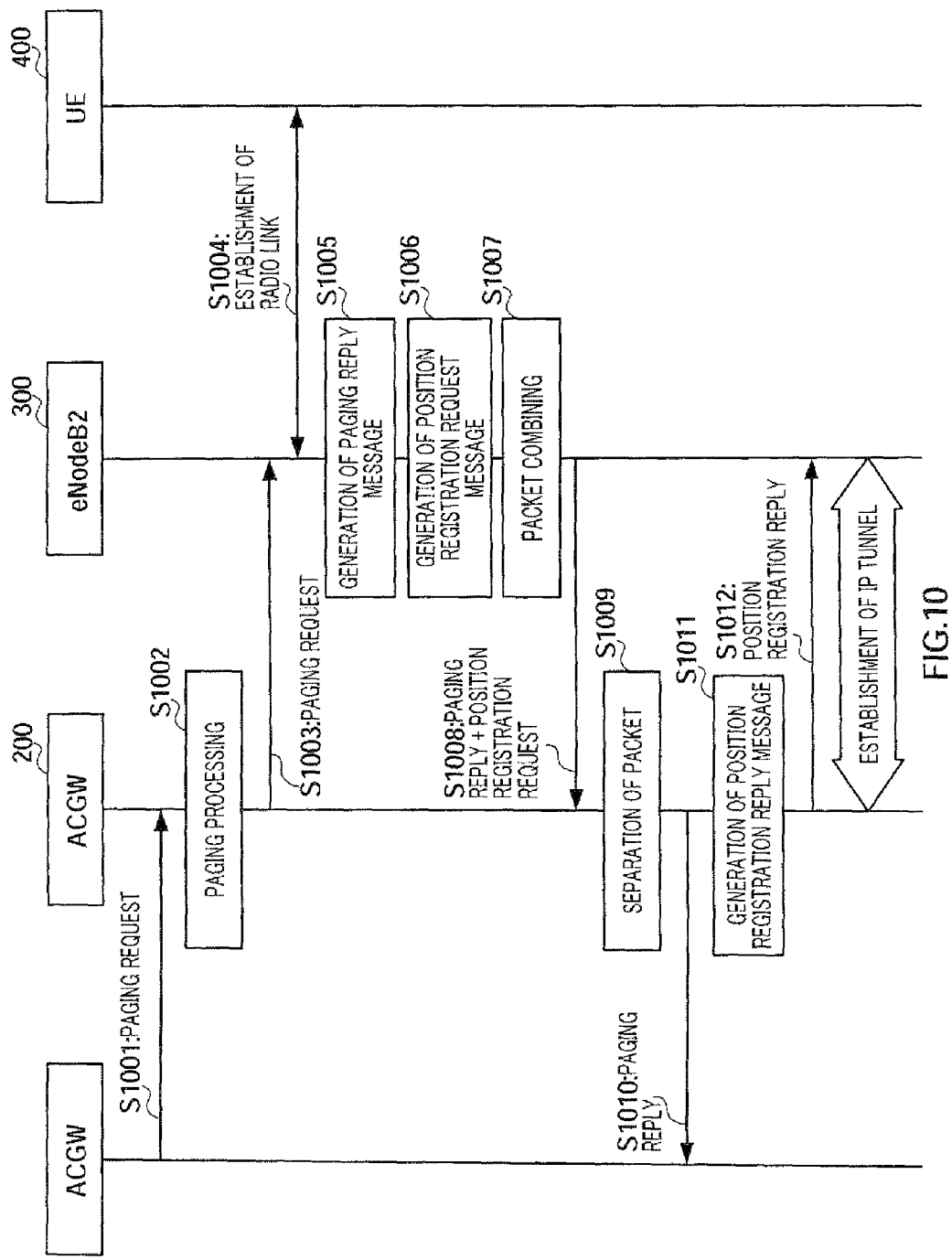
FIG. 10 is a sequence diagram illustrating operations of a communication control system according to the embodiment of the present invention.

Next, the operations of access gateway apparatus 200 and base station apparatus 300 when a paging request for a destination of radio terminal apparatus in the tracking area of access gateway apparatus 200 is received from another access gateway apparatus and so on, will be explained using the sequence diagram of FIG. 10.

In step S1001, transmitting/receiving section 201 of access gateway apparatus 200 receives a packet including a paging request message from another access gateway apparatus, and IP layer processing section 302 decapsulates the packet using the IP address set in access gateway apparatus 200, and outputs the paging request message to paging processing section 203.

In step S1002, paging processing section 203 performs paging processing based on the paging request message.

Here, the IP address of the destination radio terminal apparatus included in the paging request message, is tentatively stored in page units.

In step S1003, transmitting/receiving section 201 transmits the paging request message to base station apparatus (i.e. eNode B) 300 and transmitting/receiving section 301 of base station apparatus 300 receives this paging request message, and IP layer processing section 302 decapsulates the packet using the IP address set in base station apparatus 300, and outputs the paging request message to paging processing section 303.

In step S1004, paging processing section 303 decides whether or not it is possible to accommodate the radio terminal apparatus of the paging target of the paging request and establish a radio link. When base station apparatus 300 accommodates the radio terminal apparatus of the paging target of the paging request, a radio link is established with radio terminal apparatus 400.

In step S1005, paging processing section 303 triggers MIP position registration section 304, generates a paging reply message indicating that base station apparatus 300 accommodates the radio terminal apparatus, and outputs the paging reply message to packet combining section 305.

In step S1006, MIP position registration section 304 performs its own position registration processing, that is, registers the IP address of the radio terminal apparatus, the destination of the paging request, and the IP address set in the IP address of access gateway apparatus 200, the source of the paging request, generates a position registration request message for requesting the registration of the IP address set in base station apparatus 300, and outputs the position registration request message to packet combining section 305.

In step S1007, packet combining section 305 combines the paging reply message generated in paging processing section 303 and the position registration request message generated in MIP position registration section 304 into one packet as shown, for example, in FIG. 9, and in step S1008, transmitting/receiving section 301 transmits this combined packet to access gateway apparatus 200. That is, the paging reply and position registration request are made together.

In step S1008, transmitting/receiving section 201 receives the combined packet combined in packet combining section 305, IP layer processing section 202 decapsulates the packet and outputs the packet to packet separation section 204.

In step S1009, packet separation section 204 separates this combined packet into the paging reply message and the position registration request message, outputs the paging reply message to paging processing section 203 and the position registration request message to MIP position registration section 205 respectively.

In step S1010, paging processing section 203 checks whether or not the terminal IP address of the paging reply message separated in packet separation section 204 matches the terminal IP address of the paging request message stored in step S1002, and transmits the paging reply message to another access gateway apparatus via IP layer processing section 202 and transmitting/receiving section 201.

In step S1011, MIP position registration section 205 performs position registration processing of the radio terminal apparatus, the destination of the paging request and the base station apparatus, the source of the position registration request based on the position registration request message separated in packet separation section 204, and generates a position registration reply message. That is, when the IP address of radio terminal apparatus 400, the destination of the paging request received in step S1003 matches the IP address of radio terminal apparatus 400 of the paging reply message received in step S1008, MIP position registration section 205 registers the IP address of base station apparatus 300 that accommodates radio terminal apparatus 400 as the CoA with the routing table.

In step S1012, IP layer processing section 202 packetizes the position registration reply message generated in MIP position registration section 205, and transmitting/receiving section 201 transmits this packet to base station apparatus 300. By this means, an IP tunnel is established between access gateway apparatus 200 and base station apparatus 300, and data directed to radio terminal apparatus 400 is transmitted/received.

In this way, according to the present embodiment, access gateway apparatus 200 transmits a paging request message directed to a radio terminal apparatus to base station apparatus 300, base station apparatus 300 receives this paging request message, generates a paging reply message indicating that base station apparatus 300 accommodates the radio terminal apparatus, registers the IP address set in the access gateway apparatus, the sender of this paging request message, and generates a position registration request message for requesting the registration of the IP address set in base station apparatus 300. Base station apparatus 300 then combines the paging reply message and the position registration request message into a combined packet, and transmits the combined packet to access gateway apparatus 200. Access gateway apparatus 200 separates the combined packet transmitted from base station apparatus 300 into the paging reply message and the position registration request message, and registers the IP address set in base station apparatus 200 based on the position registration request message. By this means, it is possible to reduce the amount of traffic involved in position registration processing, reduce the processing load on the CPU and reduce the band used for the channel.

The operation of MIP is not limited to the operation explained in the above-described embodiment, and the present invention is also applicable to, for example, MIPv4, MIPv6, and HMIP. Furthermore, the paging operation and position registration operation are not limited to the operations explained in the above-described embodiment. Furthermore, the present invention is not bound to use MIP and is applicable to any protocols having similar functions to MIP.

INDUSTRIAL APPLICABILITY

The access gateway apparatus, base station apparatus, communication control system and communication control method of the present invention provides an advantage of reducing the amount of traffic involved in position registration processing, processing load on the CPU and band used for the channel, and are therefore suitable for use as a communication control system in a next-generation 3GPP system.

The invention claimed is:
1. An access gateway apparatus comprising:
a transmitting section that transmits a paging request message directed to a radio terminal apparatus to a base station apparatus accommodated in the access gateway apparatus;
a separation section that separates a combined packet in which a paging reply message transmitted from the base station apparatus and indicating that the base station apparatus accommodates the radio terminal apparatus in response to the paging request message and a position registration request message for requesting the registration of an IP address indicating the base station apparatus of the paging reply message are combined, into the respective messages; and a position registration section that registers the IP address indicating the base station apparatus based on the position registration request message.

2. A base station apparatus comprising:
a receiving section that receives a paging request message directed to a radio terminal apparatus transmitted from an access gateway apparatus;
a paging reply section that generates a paging reply message indicating that the base station apparatus accommodates the radio terminal apparatus;
a position registration requesting section that registers the IP address indicating the access gateway apparatus, the sender of the paging request message and generates a position registration request message for requesting the registration of the IP address of the base station apparatus;
a packet combining section that generates a combined packet by combining the paging reply message and the position registration request message; and
a transmitting section that transmits the combined packet to the access gateway apparatus.

3. A communication control system comprising a plurality of base station apparatuses and an access gateway apparatus that accommodates the base station apparatuses, for controlling communication with a radio terminal apparatus accommodated in one of the plurality of base station apparatuses,
the access gateway apparatus comprising:
a transmitting section that transmits a paging request message directed to the radio terminal apparatus to the base station apparatus;
a separation section that separates a combined packet in which a paging reply message transmitted from the base station apparatus and indicating that the base station apparatus accommodates the radio terminal apparatus in response to the paging request message and a position registration request message for requesting the registration of an IP address indicating the base station apparatus of the paging reply message are combined, into the respective messages; and
a position registration section that registers the IP address indicating the base station apparatus based on the position registration request message, wherein:

the base station apparatus comprising:
a receiving section that receives the paging request message transmitted from the access gateway apparatus;
a paging reply section that generates a paging reply message indicating that the base station apparatus accommodates the radio terminal apparatus;
a position registration requesting section that registers the IP address indicating the access gateway apparatus of the paging request message and generates a position registration request message for requesting the registration of the IP address of the base station apparatus;
a packet combining section that generates a combined packet by combining the paging reply message and the position registration request message; and
a transmitting section that transmits the combined packet to the access gateway apparatus.

4. A communication control method for a communication control system comprising a plurality of base station apparatuses and an access gateway apparatus that accommodates the base station apparatuses, for controlling communication with a radio terminal apparatus accommodated in one of the plurality of base station apparatuses, the method comprising:
in the access gateway apparatus:
transmitting a paging request message to the base station apparatus;
in the base station apparatus:
receiving the paging request message and generating a paging reply message indicating that the base station apparatus accommodates the radio terminal apparatus;
registering the IP address indicating the access gateway apparatus of the paging request message and generating a position registration request message for requesting the registration of the IP address of the base station apparatus;
generating a combined packet by combining the paging reply message and the position registration request message and transmitting the combined packet to the access gateway apparatus;
in the access gateway apparatus:
separating the combined packet transmitted from the base station apparatus into the paging reply message and the position registration request message; and
registering the IP address indicating the base station apparatus based on the position registration request message.

* * * * *